J. HEMMING.
GAS METER.
No. 2,837.
PATENTED NOV. 4, 1842.
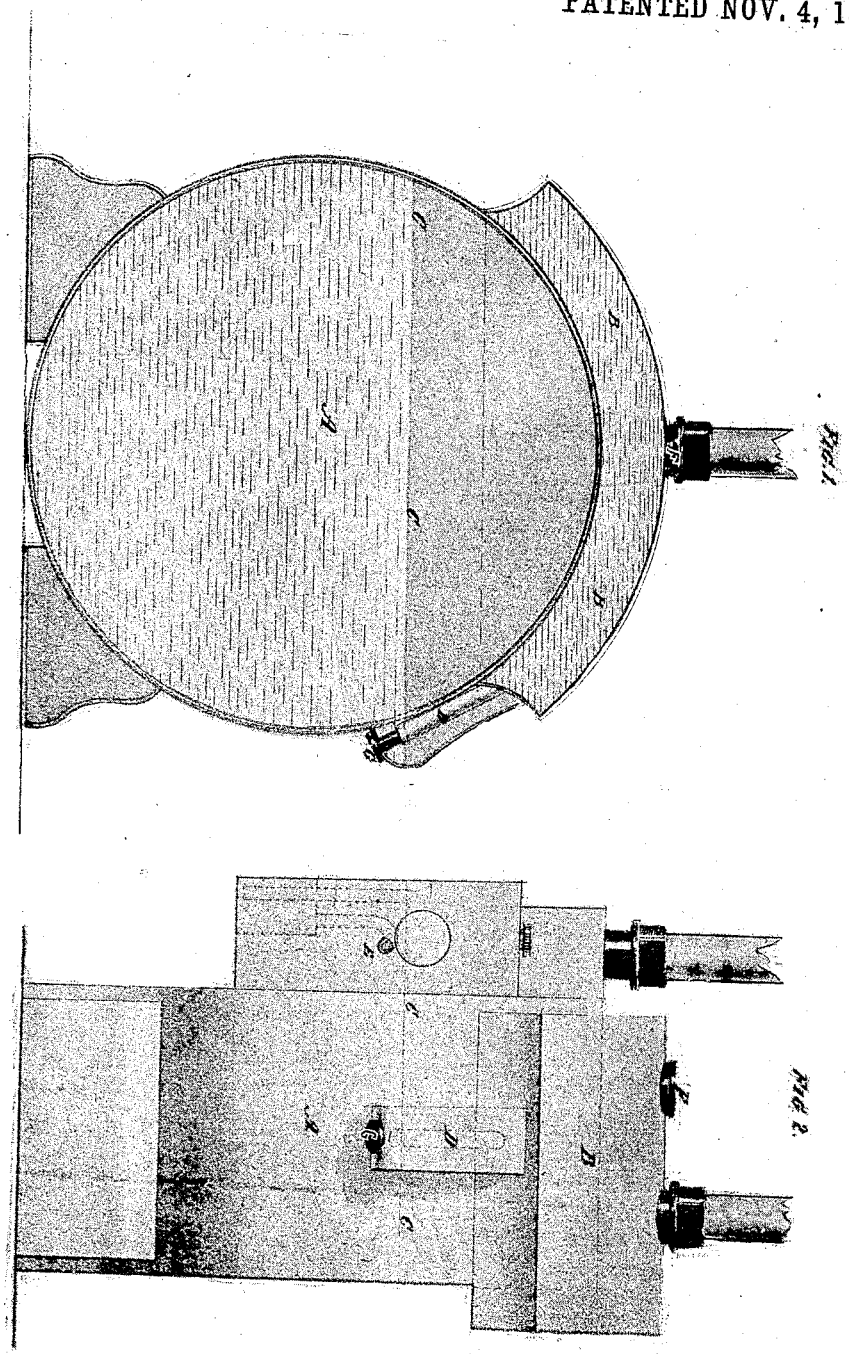

UNITED STATES PATENT OFFICE.

JOHN HEMMING, OF NORTH BANKS, GREAT BRITAIN.

GAS-METER.

Specification of Letters Patent No. 2,837, dated November 4, 1842.

*To all whom it may concern:*

Be it known that I, JOHN HEMMING, a subject of the Queen of Great Britain, and now residing at Edward Street, Cavendish Square, North Banks, in the county of Middlesex, Great Britain, have invented or discovered certain new and useful Improvements in Gas-Meters; and I, the said JOHN HEMMING, do hereby declare the nature of the invention and the manner in which the same is to be performed are fully described and ascertained in and by the following statement thereof, reference being had to the drawings hereunto annexed and to the figures and letters marked thereon—that is to say, my improvements consist in a self-acting apparatus for maintaining the liquid in the gas-meter at a uniform altitude, in the employment of a liquid that does not freeze at the ordinary temperature of freezing water, and in protecting the metals composing the meter from voltaic or chemical action.

The apparatus for maintaining the liquid at a uniform altitude is represented by the drawings annexed, Figure 1 being a section of the front and Fig. 2 an end view of the meter and apparatus.

The same letters in each drawing are attached to the same parts.

A, the body of the meter; C, C, the water level; B, B, a cistern containing liquid to supply any deficiency in A communicating with it by the pipe D; D, a pipe open at both ends to convey the liquid from B to A terminating at the water level; G, a long screw plug; E, a siphon tube to carry away any excess of water; F, an aperture for filling the cistern provided with a screw plug.

The body of the meter being filled in the ordinary way with liquid up to the proper level, the long screw G is introduced into the pipe D to prevent the liquid falling from the cistern while being filled into the meter. When the cistern is filled the screw F is inserted and screwed air tight and the long screw G removed and a short one introduced so as to permit the water to fall freely when required. The long screw may be used at the bottom or side of the meter where screws are usually employed. The end of the tube D terminates a little say one tenth of an inch below the surface of the water in the meter and the screw G being removed a short screw which does not close the aperture must be then introduced speedily to prevent any loss of the liquid. If the water by evaporation or from any other cause fall below the proper level of the lower end of the pipe D will be unsealed by the liquid consequently air or gas will pass from the meter into the cistern by the pipe D and a corresponding volume of water will descend into the meter until the end of the pipe D is again closed by the liquid when no more can descend from the cistern. If on the contrary there should arise any increase in the quantity of water it will rise above the level of the siphon pipe E and be discharged, until the proper level is attained.

It must be observed that the only way by which the liquid in B can enter the meter is through the pipe D which communicates with A.

In order to prevent the liquid employed from freezing I dissolve therein a quantity of common salt according to the temperature it is liable to. I find that from two to two pounds and a half per gallon are sufficient to prevent congelation except at extremely low temperatures when a saturated solution may be employed or a solution of the chlorid of calcium.

In order to prevent voltaic or chemical action which is frequently so destructive to some of the metals composing the meter I attach by solder or other means pieces of zinc to different parts.

I claim—

The construction of the gas meter with a supply cistern attached to it and a tube for conducting liquid from said cistern to the meter, the latter having a siphon connected with it for the purpose described the whole being constructed arranged and operating in the manner set forth.

JNO. HEMMING.

Witnesses:
W. H. RITCHIE,
FREDK. GLIDDULPH.